United States Patent [19]

Richards

[11] Patent Number: 4,870,739

[45] Date of Patent: Oct. 3, 1989

[54] APPARATUS FOR REMOVING PINS FROM CONNECTING LINK BOAT HARDWARE

[76] Inventor: Raymon E. Richards, Rte. 3, Box. 429, Ellisville, Miss. 39437

[21] Appl. No.: 210,566

[22] Filed: Jun. 23, 1988

[51] Int. Cl.[4] .............................................. B23P 19/04

[52] U.S. Cl. .......................................... 29/252; 59/7; 59/11

[58] Field of Search ....................... 29/251, 252, 426.5; 59/7, 11; 269/268, 269, 270

[56] References Cited

U.S. PATENT DOCUMENTS 1,280,296 9/1918 Pruyn .................................. 29/251
2,165,285 7/1939 Mandl .................................. 29/252
3,075,347 1/1963 Bonifas et al. .................... 29/252 X

FOREIGN PATENT DOCUMENTS 163969 1/1955 Australia ............................... 29/252
685533 9/1979 U.S.S.R. ............................. 29/426.5
148715 8/1920 United Kingdom ..................... 59/7

*Primary Examiner*—Mark Rosenbaum
*Assistant Examiner*—Andrew E. Rawlins
*Attorney, Agent, or Firm*—Dewitt L. Fortenberry, Jr.

[57] ABSTRACT

This invention discloses an apparatus for removing pins from connecting link boat hardware. After connecting links are used to secure anchors or buoyes to chains, the links often become corroded and it is difficult or impossible to remove the connecting link pin on order to release the anchor or buoy. The invention is a portable apparatus which can be attached to a connecting link in a position of alignment with the connecting link pin. A plunger is then activated so as to force the pin out of the connecting link so that the connecting link can be disassembled.

1 Claim, 3 Drawing Sheets

APPARATUS FOR REMOVING PINS FROM CONNECTING LINK BOAT HARDWARE

SUMMARY OF THE INVENTION

This invention relates to an apparatus for removing pins from connecting link boat hardware.

It is often necessary in oil field or marine related services to attach an anchor or buoy to the end of a chain or to have to replace a weak link in a chain. A device commonly used to accomplish these objectives is a connecting link which is a type of boat hardware. A manufacturer of such a connecting link is Baldt Incorporated located in Chester, Pa.

A connecting link generally consists of a body and a plurality of releasable inserts which when assembled form a plurality of loops. When disassembled, the chain link, anchor or buoy is placed within the loops and the inserts are attached to the body and a pin is driven through a hole in the inserts and body so as to provide a means for releasably securing the inserts to the body. When so assembled, the connecting link will secure the chain links, anchor or buoy to each other. When it is desired to release the anchor, buoy or chain link, a pin hammer or rod is placed on the connecting link pin and a sledgehammer is used to hit the pin hammer or rod thereby forcing the pin from the connecting link so that it can be disassembled in order to release the anchor, buoy or chain links.

However, after being used, the connecting link is often exposed to salt water and becomes corroded. Therefore, it is often difficult or impossible to remove the pin so that the inserts can be released from the body of the link in order that the anchor, buoy or chain links can be separated and released. In that situation the connecting link must be cut with a cutting torch, thereby destroying the connecting link.

Accordingly, this invention is a portable apparatus which is releasably securable to a connecting link so that a hydraulically operated plunger is aligned with the connecting link pin. The plunger is then hydraulically activated and the connecting link pin forced from the connecting link. The invention is then removed from the connecting link and the link can be disassembled in order to remove the anchor, buoy or chain links.

It is therefore an object of this invention to remove pins from connecting links.

Another object of this invention is to provide an apparatus which is releasably attachable to a connecting link in order to remove the connecting link pin An object of this invention is to also provide an apparatus which is portable and simple to operate.

It is also an object of this invention to provide an apparatus which will remove a connecting link pin safely without the necessity of having to use a sledge hammer.

Another object of this invention is to provide a device which is simple in design, easy to manufacture and simple to use.

It is also an object of this invention to remove connecting link pins without the necessity of destroying the connecting link.

Another object of this invention is to also provide a method of removing connecting link pins.

These objects together with other objects and advantages will become apparent after review of the drawings and detailed description of the invention as more fully hereinafter described and claimed.

A BRIEF DESCRIPTION OF THE DRAWINGS

Referring now to the drawings, wherein like referenced characters refer to like parts throughout the several views, and wherein.

DETAILED DESCRIPTION OF THE INVENTION

Figure 1:
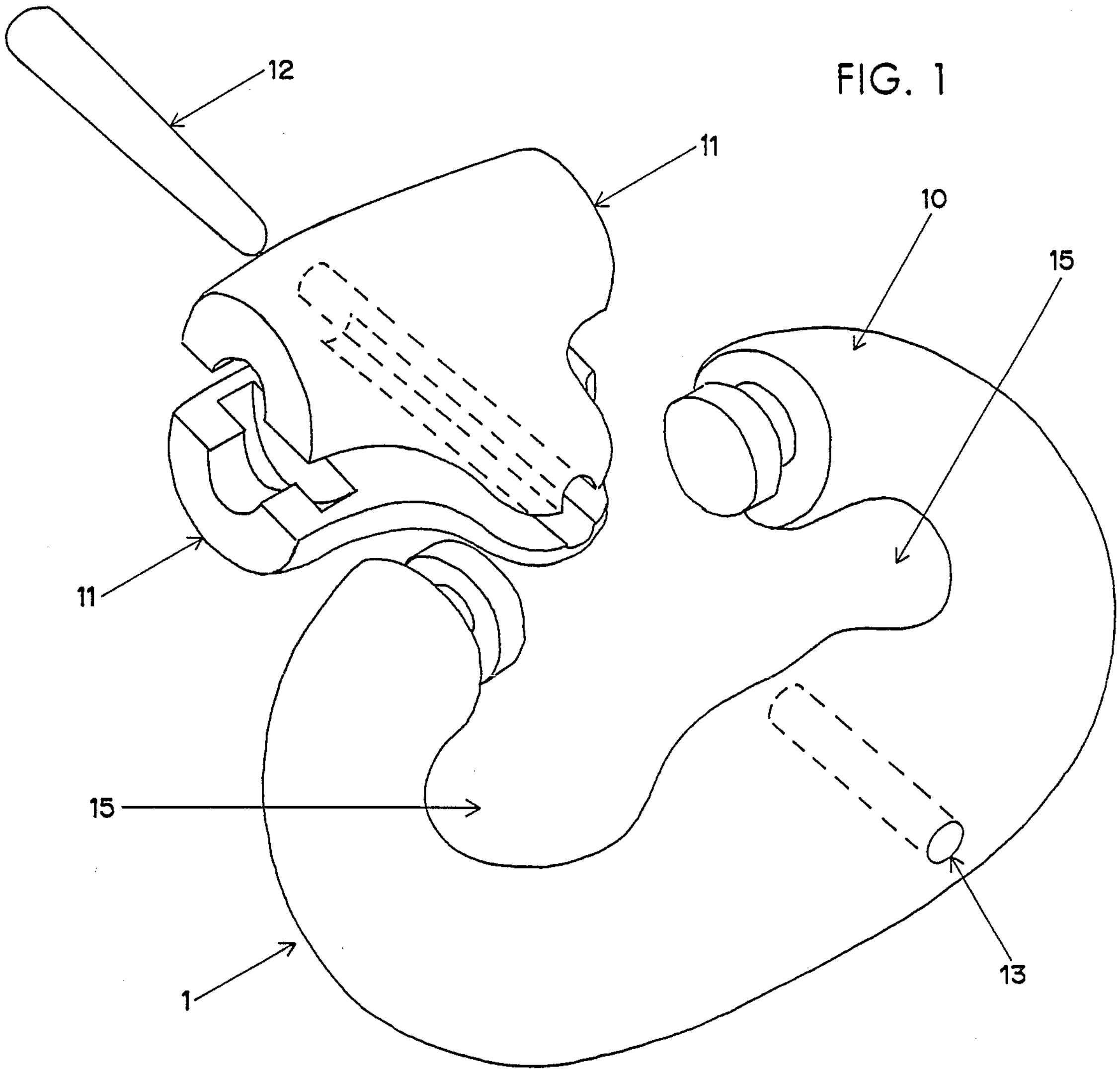
FIG. 1 is a view of a disassembled connecting link.

To understand the operation of the present invention, it is necessary to be familiar with the design of connecting link "hardware." Referring to FIG. 1, a connecting link 1 consists of a body 10 having a passageway 13, a plurality of releasable inserts 11, and a tapered pin 12. The body 10 and the releasable inserts 11 are designed so that when said inserts 11 are assembled to said body 10, a plurality of loops 15 are formed and the passageway 13 extends through said body 10 as well as through said inserts 11. When so assembled, the pin 12 is driven into the passageway 13 through the inserts 11, thereby releasably securing said inserts 11 to said body 10.

Figure 2:
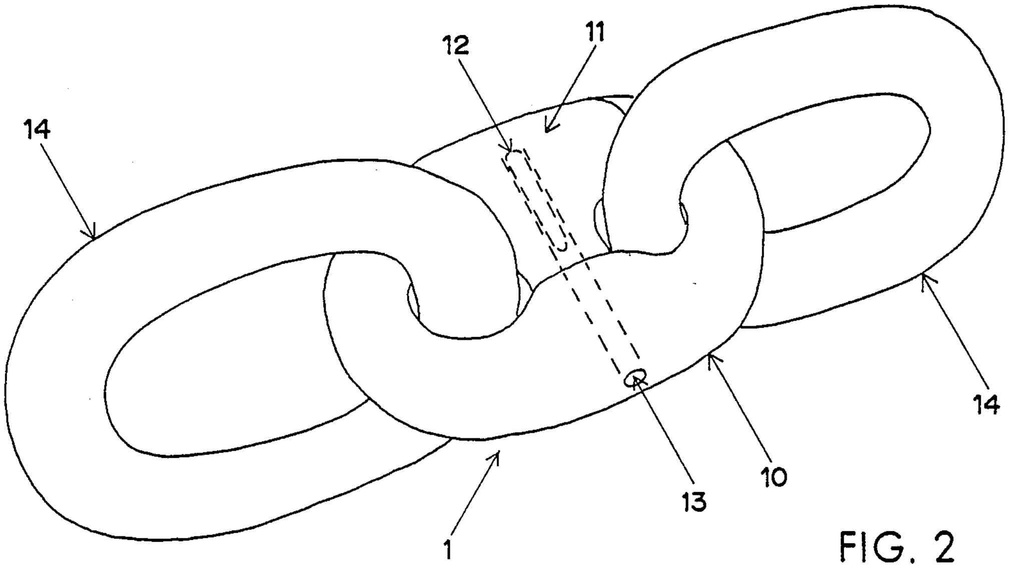
FIG. 2 is a view of an assembled connecting link secured to two chain links.

When it is desired to use the connecting link 1 to attach an anchor or buoy to the end of a chain or to replace a chain link, a chain link 14 is placed in each of the loops 15 as shown in FIG. 2. The inserts 11 are assembled to the body 10 and the pin 12 is driven into the passageway 13 so that the chain links 14 are secured together. When it is necessary to disassemble the connecting link 1 in order to release the chain links 14, a pin hammer or rod (not shown) is inserted into the passageway 13 from the body 10 side of said link 1 and a sledgehammer is used to hit the pin hammer or rod thereby forcing the pin 12 out of the passageway 13. The inserts 11 are then removed so that the chain links can be released.

Although disassembly of the connecting link 1 is a relatively simple procedure, it is often complicated by the fact that the connecting link 1 and pin 12 are corroded as the result of being exposed to salt water. Therefore, it can be dangerous to try to remove a corroded pin 12 because it is necessary for someone to hold the pin hammer, rod, and/or connecting link 1 while another person hits the pin hammer or rod with a sledgehammer. Nevertheless, it is still difficult or impossible to remove the pin 12 in order to disassemble the connecting link 1. When the pin 12 cannot be removed, the only alternative is to cut the connecting link 1 with a cutting torch thereby destroying the connecting link 1 which results in the loss of equipment and money.

Figure 3:
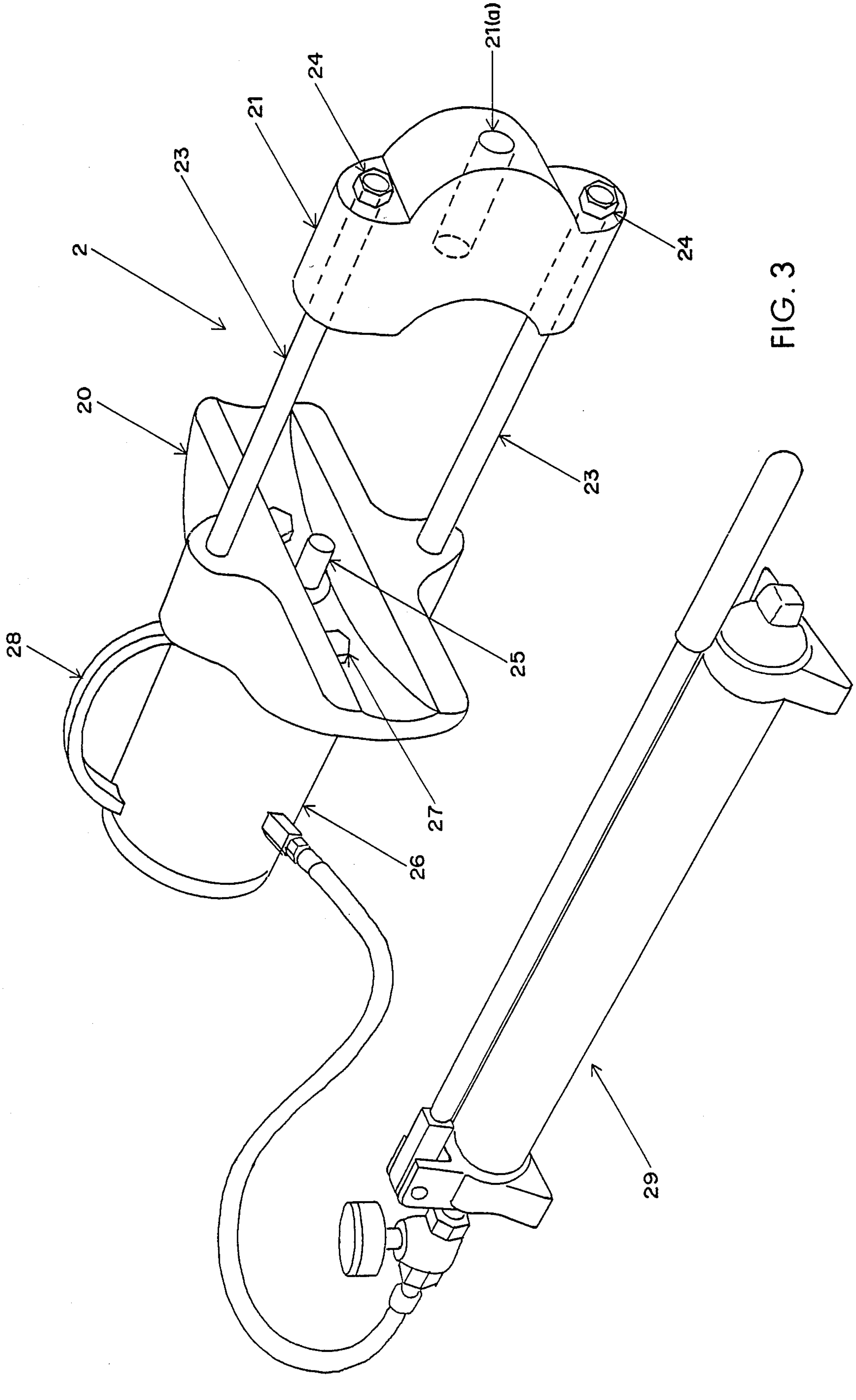
FIG. 3 is a view of the invention.

The present invention circumvents the above problems by making it easy to remove connecting link pin so that the connecting link can be disassembled. Referring to FIG. 3, the invention consists of a plunger 25 and a means for supporting and operating said plunger 25. The means for supporting and operating said plunger 25 consists of a housing 26 containing a hydraulic cylinder (not shown) which is connected to the plunger 25. A hydraulic gun 29 is connected to the housing 26 so that when the gun 29 is operated the hydraulic cylinder moves the plunger 25 back and forth in longitudinal direction. A handle 28 is provided to make it easier to "handle" and position the invention.

A front side shoe 20 is attached to the housing 26 by a multiplicity of bolts 27. Said front side shoe 20 also includes a passageway which allows for the longitudinal movement of the plunger 25 while the front side shoe also supports said plunger 25. The front side shoe 20 also includes a plurality of rods 23.

A back side shoe 21 having a passageway 21(*a*) is designed so as to be releasably attachable to said rods 23. It should be noted that the passageway 21(*a*), is in a location so that it is oppositely aligned with the plunger 25 when the back side shoe 21 is attached to said rods 23.

Figure 4:
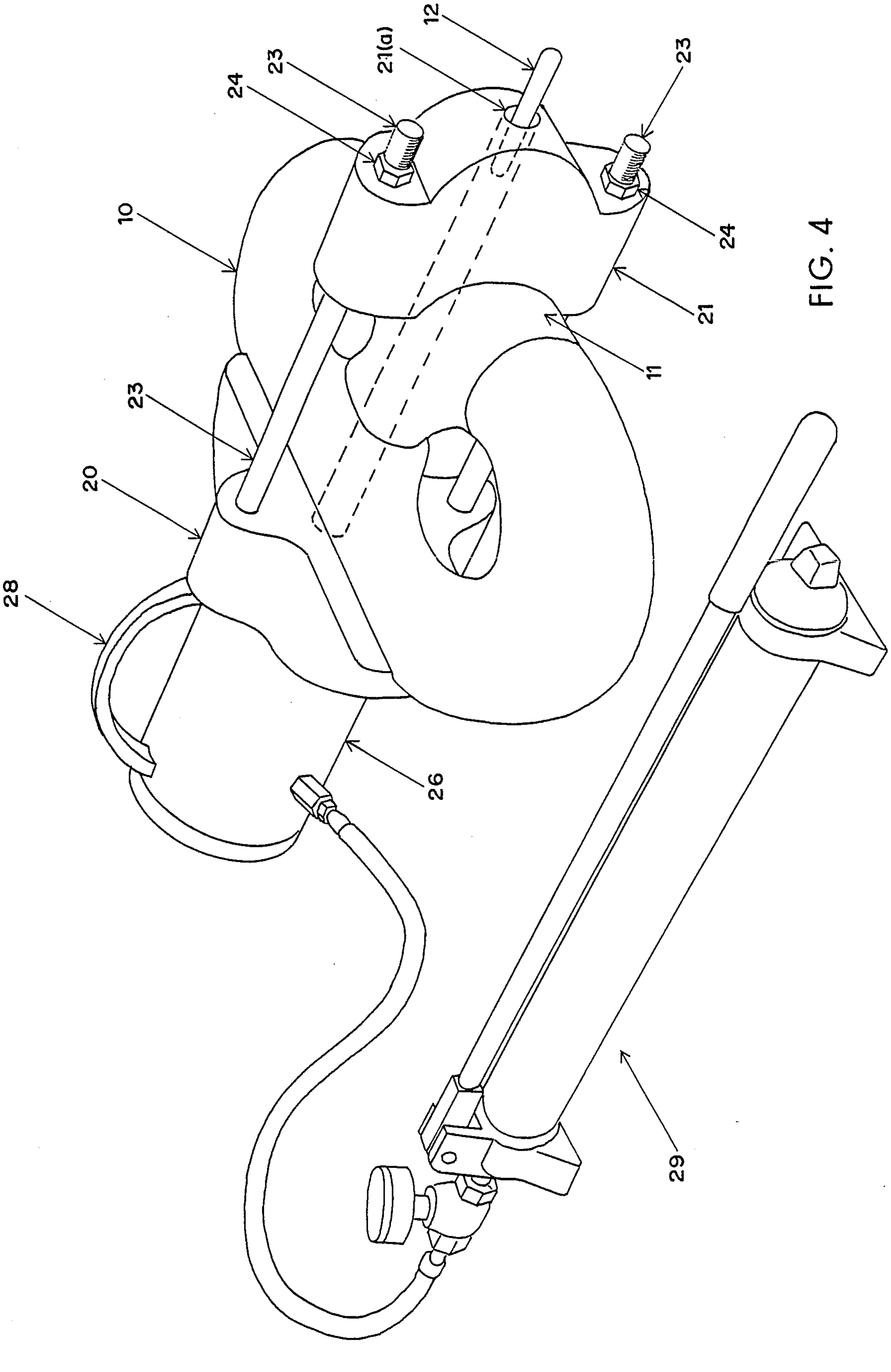
FIG. 4 is a view of the invention attached to a connecting link with the connecting link pin having been removed.

When it is desired to remove a pin 12 from a connecting link 1, the body 10 of the connecting link 1 is placed against the front side shoe 20 as shown in FIG. 4, so that the passageway 13 through said connecting link 1 is aligned with the plunger 25. The back side shoe 21 is then releasably attached to the rods 23 by the bolts 24 so that the passageway 21(*a*) through said back side shoe 21 is also aligned with the passageway 13 of said connecting link 1. In this position, it is readily seen that the connecting link 1 is releasably secured to the invention 2. The hydraulic gun 29 is then operated to move the hydraulic cylinder thereby moving the plunger 25 into the passageway 13 of the connecting link 1 so as to force the pin 12 out of said passageway 13. The back side shoe 21 is then removed from the rods 23 in order to release the connecting link 1 from the invention so that said connecting link can be disassembled.

Although particular components have been discussed with the specific embodiment of the invention, other components may be utilized in accordance with the teachings of the present invention. Furthermore, it is understood that although an exemplary embodiment of the invention has been disclosed, other application and mechanical arrangements are possible and the embodiment disclosed may be subjected to various changes, modifications, and substitutes without departing from the spirit of the invention.

What is claimed is:

1. An apparatus for removing pins from connnecting link hardware which comprises:

a plunger;

a means for supporting and operating said plunger, said means allowing for the longitudinal movement of said plunger;

a front side shoe releasably secured to said means for supporting said plunger, said front side shoe having a passageway for the longitudinal movement of said plunger, said front side shoe also having a face side for accepting a connecting link so that said front side shoe aligns said connecting link pin with said plunger; and a back side shoe releasably attachable to said front side shoe, said back side shoe having a passageway for accepting a connecting link pin, said back side shoe also having a face side for accepting a connecting link so that said back side shoe aligns said connecting link pin with said passageway for accepting a connecting link pin;

whereby the backside shoe is detached from said front side shoe and a connecting link is placed against the face side of said front side shoe so that the plunger is aligned with the hole in which the connecting link pin is secured; the face side of said back side shoe being aligned with the side of the connecting link pin opposite the front side shoe, so that the back side shoe passageway is opposite said plunger, and said back side shoe being secured to said front side shoe, said means for operating said plunger then being activated to force said plunger against said connecting link pin thereby pushing the connecting link pin out of the connecting link and into the backside shoe passageway.

* * * * *